United States Patent
Domon et al.

(10) Patent No.: US 6,950,408 B1
(45) Date of Patent: Sep. 27, 2005

(54) SPEED CONVERTER FOR IEEE-1394 SERIAL BUS NETWORK

(75) Inventors: Wataru Domon, Tokyo (JP); Jun-ichi Matsuda, Tokyo (JP); Shuntaro Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 756 days.

(21) Appl. No.: 09/671,150

(22) Filed: Sep. 28, 2000

(30) Foreign Application Priority Data

Sep. 29, 1999 (JP) .................................. 11-277561

(51) Int. Cl.⁷ ............................................ H04L 12/28
(52) U.S. Cl. ...................................... 370/257; 370/402
(58) Field of Search ............................... 370/229, 230, 370/230.1, 231, 232, 233, 234, 235, 252, 370/253, 257, 400, 401, 402, 403, 465, 466, 370/467, 241, 247, 254, 464, 503, 489, 490

(56) References Cited

U.S. PATENT DOCUMENTS

| | | | | |
|---|---|---|---|---|
| 5,504,757 A * | 4/1996 | Cook et al. | .................. | 370/468 |
| 5,799,207 A * | 8/1998 | Wang et al. | ................... | 710/38 |
| 5,915,119 A * | 6/1999 | Cone | ........................... | 713/310 |
| 6,397,277 B1 * | 5/2002 | Kato et al. | ................... | 710/104 |
| 6,466,549 B1 * | 10/2002 | Hattig | ......................... | 370/254 |
| 6,509,988 B1 * | 1/2003 | Saito | ............................. | 398/47 |
| 6,775,244 B1 * | 8/2004 | Hattig | ........................ | 370/257 |

FOREIGN PATENT DOCUMENTS

| | | | |
|---|---|---|---|
| EP | 0 933 900 | | 8/1999 |
| EP | 002244691 | * | 8/1999 |
| EP | 0 939 530 | | 9/1999 |
| EP | 00120268 | * | 1/2003 |
| JP | 10-145433 | | 5/1998 |
| JP | 11-215161 | | 8/1999 |

OTHER PUBLICATIONS

Article—David, James Dr., "Contribution to p1394.1 Working Group", Aug., 1999, pp. i-v, 25, 30-35, 63, 77-78, 82, 89-90, 94.

* cited by examiner

Primary Examiner—Dang Ton
Assistant Examiner—Phuc Tran

(57) ABSTRACT

In a speed converter for an IEEE-1394 serial bus network, first and second communication device nodes are attached to first and second buses. A first transceiver node receives an inbound first packet at a first speed from the first bus and transmits an inbound second packet, which is received from the second bus by a second transceiver node at a second speed, as an outbound second packet at the first speed to the first bus. The second transceiver node transmits the inbound first packet as an outbound first packet at a second speed to the second bus. Header translation circuitry translates the destination identifier of the inbound first packet to the destination identifier of the outbound first packet according to a mapped relationship between the first transceiver node and the second communication node, and translates the destination identifier of the inbound second packet to the destination identifier of the outbound second packet.

20 Claims, 11 Drawing Sheets

| SPEED SETTING VALUE | CONVERSION MODE |
|---|---|
| 0 | 100 Mbps FOR BOTH ISO/ASYNC |
| 1 | 200 Mbps FOR BOTH ISO/ASYNC |
| 2 | 400 Mbps FOR BOTH ISO/ASYNC |
| 3 | 100 Mbps FOR ISOCHRONOUS AVAILABLE MAXIMUM SPEED FOR ASYNC |
| 4 | 200 Mbps FOR ISOCHRONOUS AVAILABLE MAXIMUM SPEED FOR ASYNC |
| 5 | 400 Mbps FOR ISOCHRONOUS AVAILABLE MAXIMUM SPEED FOR ASYNC |
| 6 | NO SPEED CONVERSION |

FIG. 6A

| PHY ID OF XCVR NODE 210 | PHY ID OF B2-COMM NODE |
|---|---|
| 3 | 0 (NODE 241) |

FIG. 6B

| PHY ID OF XCVR NODE 220 | PHY ID OF B1-COMM NODE |
|---|---|
| 1 | 2 (NODE 231) |
| 1 | 1 (NODE 232) |
| 1 | 0 (NODE 233) |

FIG. 13A

| PHY ID OF XCVR NODE | PHY ID OF B2-COMM NODE |
|---|---|
| 4 (NODE 211) | 2 (NODE 321) |
| 3 (NODE 212) | 1 (NODE 322) |
| 2 (NODE 213) | 0 (NODE 323) |

FIG. 13B

| PHY ID OF XCVR NODE | PHY ID OF B1-COMM NODE |
|---|---|
| 4 (NODE 221) | 1 (NODE 311) |
| 3 (NODE 222) | 0 (NODE 312) |

XCVR NODE 210

XCVR NODE 220

FIG. 9A
oMPR FORMAT

| Data rate capability | Broadcast channel base | Non-persistent extension field | Persistent extension field | Reserved | Number of output plugs |
|---|---|---|---|---|---|
| 2 | 6 | 8 | 8 | 3 | 5 |

FIG. 9B
iMPR FORMAT

| Data rate capability | Reserved | Non-persistent extension field | Persistent extension field | Reserved | Number of output plugs |
|---|---|---|---|---|---|
| 2 | 6 | 8 | 8 | 3 | 5 |

FIG. 9C
oPCR FORMAT

| On-line | Broadcast connection counter | Point-to-point connection counter | Reserved | Channel number | Data rate | Overhead ID | Payload |
|---|---|---|---|---|---|---|---|
| 1 | 1 | 6 | 2 | 6 | 2 | 4 | 10 |

FIG. 9D
iPCR FORMAT

| On-line | Broadcast connection counter | Point-to-point connection counter | Reserved | Channel number | Reserved |
|---|---|---|---|---|---|
| 1 | 1 | 6 | 2 | 6 | 16 |

SPEED CONVERTER FOR IEEE-1394 SERIAL BUS NETWORK

BACKGROUND OF THE INVENTION

1. Field of the Invention

The present invention relates generally to IEEE-1394 serial bus networks, and more specifically to speed conversion of packets transmitted between nodes attached to the IEEE-1394 serial buses.

2. Description of the Related Art

IEEE-1394 Serial Bus Standard supports high performance packet transfer at speeds of 100 Mbps, 200 Mbps, and 400 Mbps on a high reliability asynchronous transfer mode (though latency is not guaranteed) and on a bandwidth guaranteed isochronous transfer mode. The IEEE-1394 serial bus is best suited for digital video cameras. With the built-in feature of IEEE-1394 interface, standardized digital video cameras have met with wide reception among consumers.

In a single IEEE-1394 serial bus network, data transfer at different speeds is possible. For example, a 100-Mbps transfer may proceed between two nodes on a cable segment and a 400-Mbps transfer may proceed between other two nodes on a separate cable segment. Since high speed nodes support lower speed transfers, the same node can communicate with a node at a low speed at one time and communicate with another node at a higher speed at different time.

However, from the bandwidth savings viewpoint, the use of a low speed node is not a favorable situation because the time taken to transmit a given amount of information is longer than the time a higher speed node takes to transmit the same amount of information. For example, if a video channel is transmitted on a 100-Mbps isochronous mode, a period of 40 microseconds is required during each 125-microsecond cycle. Since the IEEE-1394 standard specifies that the maximum amount of time available for isochronous transfer for each cycle is 100 microseconds, the maximum number of video channels which the current IEEE-1394 serial bus can support is only two. Therefore, use of different speed nodes in a single IEEE-1394 serial bus network represents a waste of otherwise usable bandwidth resource.

SUMMARY OF THE INVENTION

It is therefore an object of the present invention to reduce the otherwise wasted bandwidth resource of an IEEE-1394 serial bus network by providing a speed converter for converting the speed of packets between nodes having different speed capabilities.

According to a first aspect of the present invention, there is provided a speed converter for converting the speed of packets transmitted between first and second communication nodes respectively attached to first and second IEEE-1394 serial buses, comprising a first transceiver node for receiving an inbound first packet at a first speed from the first bus and transmitting an inbound second packet as an outbound second packet at the first speed to the first bus, a second transceiver node for transmitting the inbound first packet as an outbound first packet at a second speed to the second bus and receiving the inbound second packet at the second speed from the second bus, and header translation circuitry for translating destination identifier of the inbound first packet to destination identifier of the outbound first packet according to a mapped correspondence between the first transceiver node and the second communication node, and translating destination identifier of the inbound second packet to destination identifier of the outbound second packet.

According to a second aspect, the present invention provides a speed converter for converting the speed of packets transmitted between a plurality of first communication nodes attached to a first IEEE-1394 serial bus and a plurality of second communication nodes attached to a second IEEE-1394 serial bus. The speed converter includes at least one first repeater node connected to the first bus, a first transceiver node for receiving an inbound first asynchronous packet from the first bus at a first speed via the at least one first repeater node and transmitting an inbound second asynchronous packet as an outbound second asynchronous packet at the first speed to the first bus via the at least one first repeater node, the first transceiver node having identifiers identifying the first transceiver node itself and the at least one first repeater node, at least one second repeater node connected to the second bus, a second transceiver node for transmitting the inbound first asynchronous packet as an outbound first asynchronous packet to the second bus at a second speed via at least one second repeater node and receiving the inbound second asynchronous packet from the second bus at the second speed via the at least one second repeater node and receiving the inbound second asynchronous packet at the second speed from the second bus via the at least one second repeater node, the second transceiver node having identifiers identifying the second transceiver node itself and the at least one second repeater node, and header translation circuitry for translating destination identifier of the inbound first asynchronous packet received by the first transceiver node to destination identifier of the outbound first asynchronous packet according to mapped relationships between the second communication nodes and the first transceiver node and the at least one first repeater node, and translating destination identifier of the inbound second asynchronous packet received by the second transceiver node to destination identifier of the outbound second asynchronous packet according to mapped relationships between the first communication nodes and the second transceiver node and the at least one second repeater node.

According to a third aspect of the present invention, the speed converter is provided for converting the speed of packets transmitted between a plurality of first communication nodes attached respectively to a plurality of first IEEE-1394 serial buses and at least one second communication node attached to a second bus. The speed converter comprises a plurality of speed conversion units associated respectively with the plurality of first buses. Each speed conversion unit includes a first transceiver node for receiving an inbound first packet at a first speed from the associated first bus and transmitting an inbound second packet as an outbound second packet at the first speed to the associated first bus, a second transceiver node for transmitting the inbound first packet as an outbound first packet at a second speed to the second bus and receiving the inbound second packet at the second speed from the second bus, and header translation circuitry for translating destination identifier of the inbound first packet to destination identifier of the outbound first packet according to mapped relationship between the first communication node of the associated first bus and the at least one second communication node, and translating destination identifier of the inbound second packet to destination identifier of the outbound second packet.

BRIEF DESCRIPTION OF THE DRAWINGS

The present invention will be described in further detail with reference to the accompanying drawings, in which:

FIGS. 6A and 6B show mapping tables associated with FIG. 5 for translating source and destination identifiers of an inbound asynchronous packet to source and destination identifiers of an outbound asynchronous packet;

FIGS. 9A–9D show data formats of master plug registers and plug control registers of one of the link layer processors;

FIGS. 13A and 13B show mapping tables associated with FIG. 12 for translating source and destination identifiers of an inbound asynchronous packet to source and destination identifiers of an outbound asynchronous packet.

DETAILED DESCRIPTION

Figure 1:
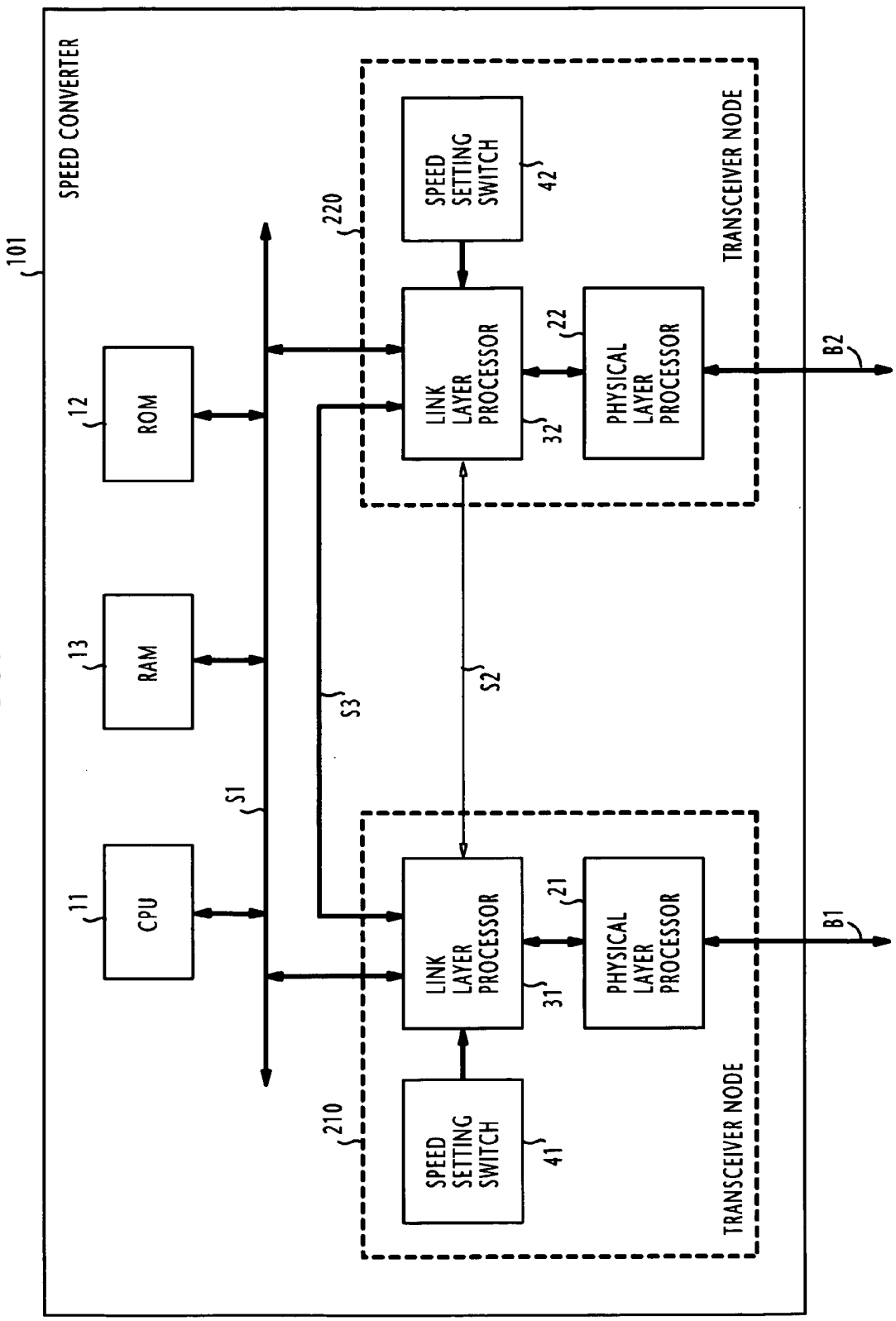
FIG. 1 is a block diagram of a speed converter according to a first embodiment of the present invention for converting the speed of packets transmitted on the IEEE-1394 serial bus.

In FIG. 1, a packet speed converter for an IEEE-1394 serial bus network according to a first embodiment of the present invention is designated by numeral 101. Speed converter 101 is a module that is attached to IEEE-1394 serial buses B1 and B2 and includes a pair of transceiver nodes 210 and 220. Although not shown in the drawings, an isochronous resource manager is attached to each of the buses B1 and B2 for channel number and bus bandwidth allocation for isochronous transfers.

Transceiver node 210 includes a physical layer processor (LSI) 21 connected to the bus B1, a link layer processor (LSI) 31 and a speed setting switch 41 for setting a desired first speed value into the link layer processor 31. Likewise, the transceiver node 220 has a physical layer processor 22 connected to the bus B2, a link layer processor 32 and a speed setting switch 42 for setting a desired second speed value into the link layer processor 32. Physical layer processors 21, 22 and the link layer processors 31, 32 are designed to provide the functions specified by the IEEE-1394 Standard. Further, each physical layer processor and the associated link layer processor are interconnected via an interface specified by the IEEE-1394 Standard. Note that speed setting may also be achieved by coupling the speed setting switches 41 and 42 to the CPU 11 via the host bus S1 and setting desired speed values into the respective link layer processors 31, 32 from the CPU 11.

Link layer processors 31 and 32 are connected to a host bus S1 and are interconnected by an isochronous data path S2 and a sync signal path S3 for transmission of synchronized isochronous packets. Host bus S1 serve as a data path for asynchronous packets.

Figures 2, 5:
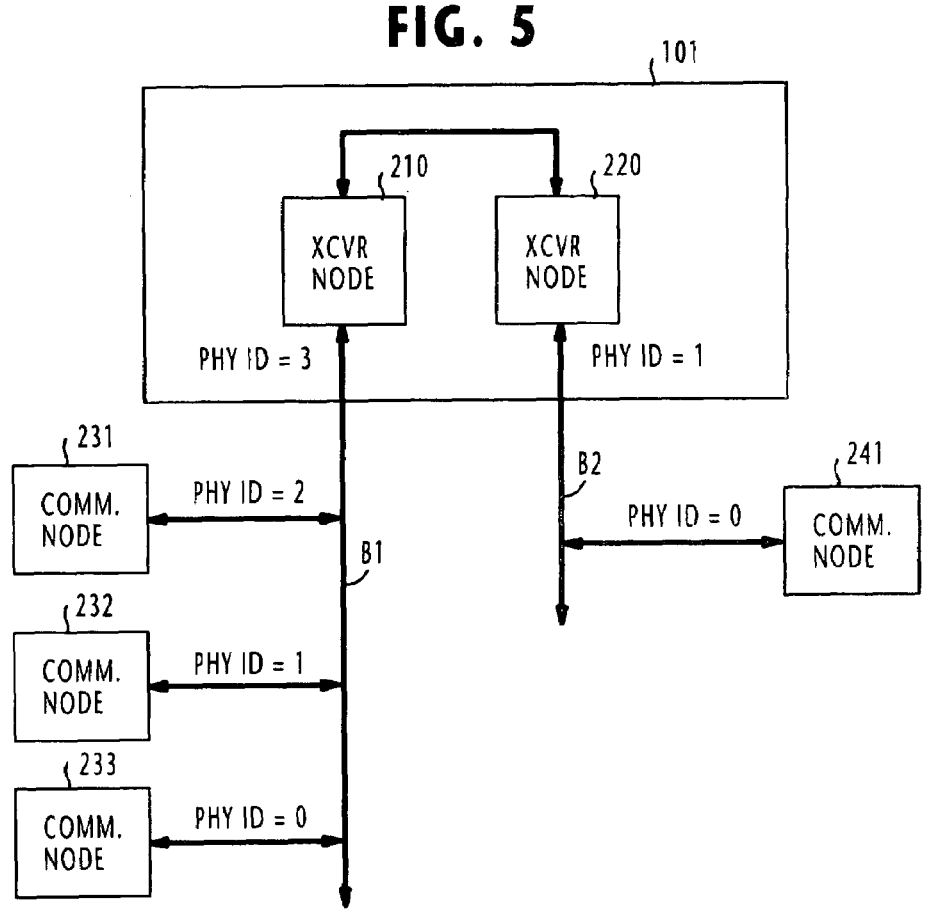
FIG. 2 is an illustration of speed setting values selected by the speed setting switches of FIG. 1 for determining the speed of outgoing packets of the speed converter.
FIG. 5 is a block diagram of a simplified IEEE-1394 serial bus network useful for describing mapping tables for mapping identifiers of the network nodes.

Each of the speed setting switches 41, 42 has a plurality of speed setting values 0, 1, 2, 3, 4, 5 and 6 as shown in FIG. 2. Speed setting values 0, 1, 2, 3, 4, 5 and 6 correspond to respective speed conversion parameters. For speed setting values 0, 1, and 2, the speed of primary packets (either isochronous or asynchronous) is converted to 100 Mbps, 200 Mbps and 400 Mbps, respectively. For speed setting values 3, 4 and 5, the same conversion speed values are used for isochronous packets, but the speed of asynchronous packets is converted to a maximum possible value. For speed setting value 6, the speed converter performs no speed conversion so that packets are transmitted at the same speed as they are received. Link layer processors 31 and 32 transmit primary packets according to the speed value set by the associated speed setting switches 41, 42.

To perform speed conversion for asynchronous transfers, the speed converter performs header translation. For this purpose, the speed converter further includes a central processing unit 11, a read-only memory 12 and a random access memory 13, all of which are connected to the host bus S1. To achieve packet header translation, the CPU 11 executes programmed instructions of the present invention stored in the read-only memory 12. As will be described, the RAM 13 maintains mapping tables which define relationships between old and new destination identifiers. An asynchronous packet transmitted at a first speed from the bus B1, for example, is received by the transceiver node 210 and temporarily stored in the RAM 13. One of these mapping tables is used by the CPU 11 for translating the source and destination identifiers contained in the stored packet header to the identifiers of the node 220 and a destination node attached to the bus B2. The header-translated packet is then transmitted from the transceiver node 220 to the bus B2 at a second speed.

In addition, for speed conversion of asynchronous packets, the CPU 11 has the function of segmenting a high speed packet into a series of low speed packets if the payload size of a transmitted high speed packet exceeds the maximum payload size of the low speed packet, since the maximum payload size of 400-Mbps packets is 2048 bytes while the maximum payload size of 100 Mbps packets is 512 bytes.

On the other hand, channel number translation is performed for isochronous (stream) transfers since the target node is identified by a channel number instead of by a node identifier. For this reason, the transceiver nodes 210 and 220 are respectively set to different channel numbers before an isochronous transfer begins. As will be described in detail later, stream packets transmitted on the bus B2, for example, are received by the node 220 and passed through the isochronous data path S2 to the node 210, where the channel number contained in their header is translated to the channel number set in the node 210 and then transmitted to the bus B1.

Note that the speed converter of this invention does not perform transfer operations on all types of packets that propagate over the associated buses. For example, all PHY packets transferred between physical layers and all acknowledgment packets on the buses are not transferred. The types of packets that are transferred through the speed converter are the asynchronous packet and the stream packet which are generally classified under the category of primary packets.

Figure 3:
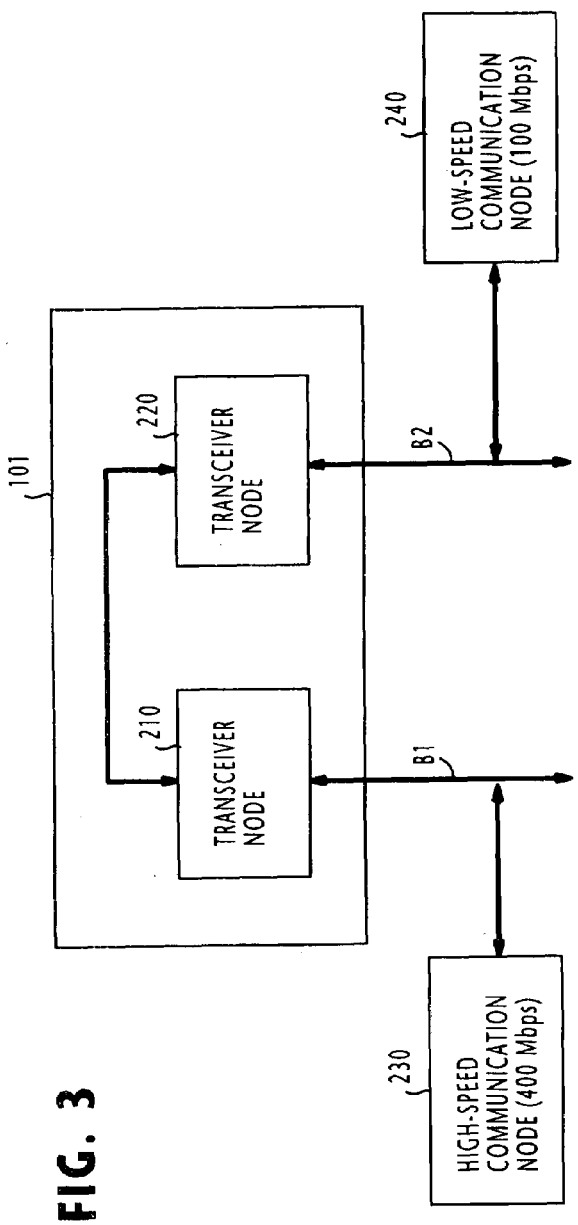
FIG. 3 is a block diagram of a simplified IEEE-1394 serial bus network useful for describing the speed conversion of primary packets synchronized to cycle start packets.
Figure 4:
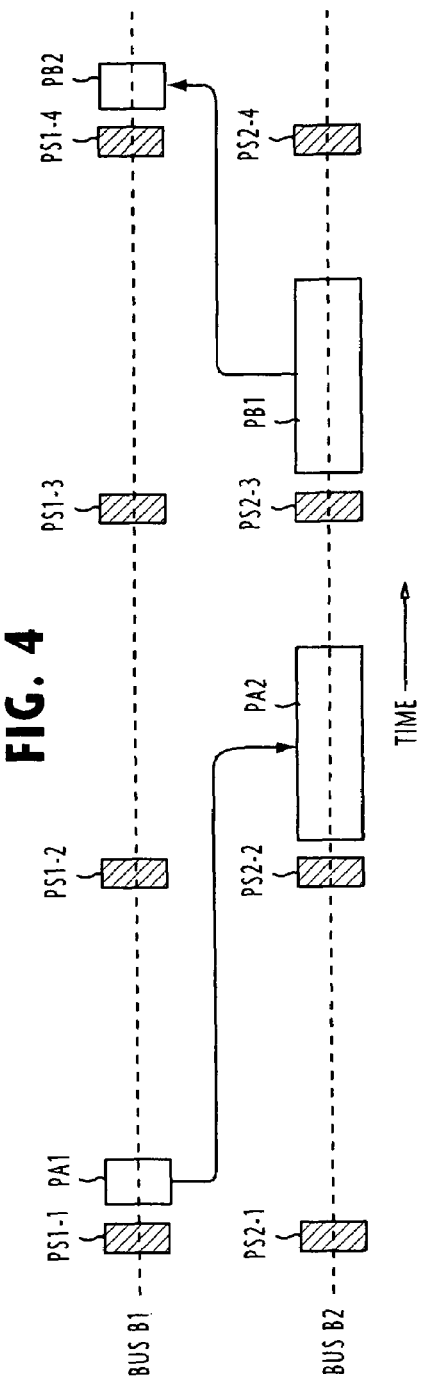
FIG. 4 is a sequence diagram for illustrating incoming packets and speed converted outgoing packets.

If two devices of different speeds are attached to the buses B1 and B2 as represented by a 400-Mbps communication node 230 and a 100-Mbps communication node 240 in FIG. 3, cycle start packets PS1 are sent on bus B1 and cycle start packets PS2 are sent on bus B2, synchronized to the cycle start packets PS1, as shown in FIG. 4. If a 400-Mbps primary packet PA1 is sent from node 230 on bus B1 immediately following a cycle start packet PS1-1, the packet is translated to a 100-Mbps primary packet PA2 and forwarded onto bus B2 immediately following a cycle start packet PS2-2. Likewise, if a 100-Mbps primary packet PB1 is transmitted from node 240 on bus B2 immediately following a cycle start packet PS2-3, the packet is translated to a 400-Mbps primary packet PB2 and forwarded onto bus B1 immediately following a cycle start packet PS1-4. In this way, the speed converter allows other high speed packets to be multiplexed on the bus B1 to achieve efficient utilization of the bus B1. More specifically, since 100-Mbps standard digital video signals take some 40 microseconds per cycle to travel over the IEEE-1394 serial bus, the current system can support only two channels for simultaneous transmission. Therefore, the speed converter of this invention can support eight channels of 100-Mbps digital video signals by converting their speed to 400 Mbps.

All nodes of the network are identified by a node identifier which consists of a 16-bit bus ID and a physical ID. Since the speed converter of this invention may be connected in an existing bus which is assigned a single bus identifier, the buses B1 and B2 are assumed to be assigned the same bus identifier, "$3FF_h$", for example. Thus, in the present invention, the physical ID can be used to represent the node ID of each node of the network. For asynchronous transactions, a packet from a sending node contains its node ID in the source address field of its header and the node ID of a destination node in the destination address field.

As described above, mapping tables are defined in the random access memory 13 for translating the header of an inbound asynchronous packet to the header of an outbound asynchronous packet. As shown in FIG. 5, three communication nodes 231, 232, 233 are attached to the bus B1 and a single communication node 241 is attached to the bus B2. Assume that the communication nodes 231, 232 and 233 on bus B1 are assigned physical IDs "2", "1" and "0", respectively, and the communication node 241 on bus B2 is assigned a physical ID "0". Further, the transceiver nodes 210 and 220 of the speed converter are assumed to be assigned physical IDs "3" and "1", respectively.

For a serial bus network such as shown in FIG. 5, two mapping tables are defined: a mapping table 61 shown in FIG. 6A, and a mapping table 62 shown in FIG. 6B. In the mapping table 61, the physical ID=3 of transceiver node 210 on the side of bus B1 is mapped to the physical ID=0 of communication node 241 on bus B2. In the mapping table 62, the physical ID=1 of transceiver node 220 on the side of bus B2 is mapped to the physical IDs=2, 1 and 0 of communication nodes 231, 232 and 233 on bus B1.

When translating the header of an asynchronous packet transmitted from any of the communication nodes 231, 232 and 233 to the communication node 241, the CPU 11 uses the mapping table 61. CPU 11 accesses the mapping table 62 to perform header translation on asynchronous packets transmitted from the communication node 241 to any of the communication nodes 231, 232 and 233.

Figure 7:
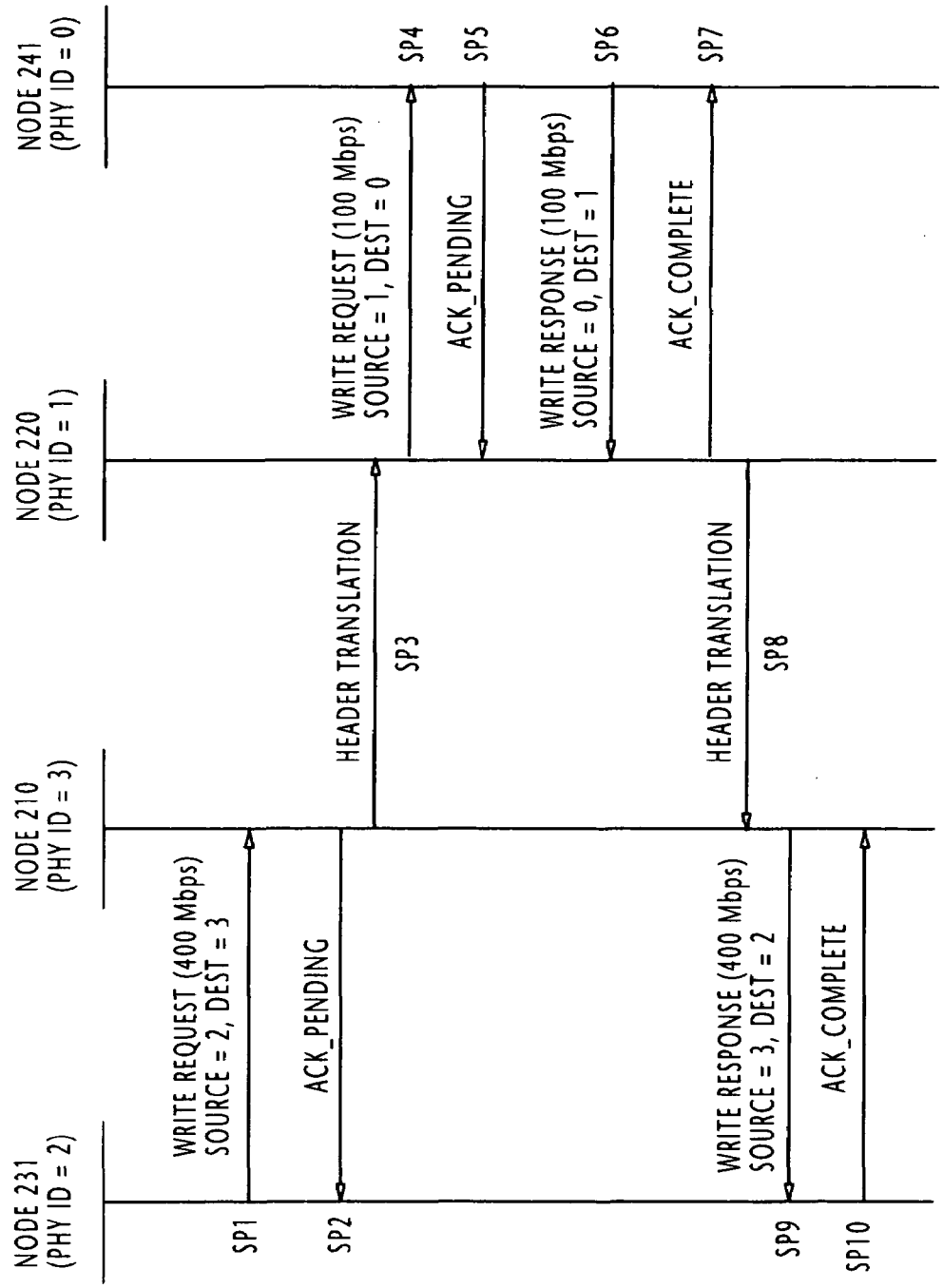
FIG. 7 is a sequence diagram illustrating an example asynchronous data transfer using a write request packet and a write response packet.

FIG. 7 is a sequence diagram of asynchronous transactions between communication nodes 231 and 241 when the speed setting switches 41 and 42 are respectively set to "2" (=400 Mbps) and "0" (=100 Mbps) (= 400 Mbps). At step SP1, the node 231 transmits a write request packet at the set speed of 400 Mbps, with the source and destination fields respectively set to the physical ID (=2) of the source node 231 and physical ID (=3) of the transceiver node 210. Node 210 responds to the write request packet with an ack_pending packet (step SP2). The write request packet received by the node 210 is stored in the RAM 13. At step SP3, the CPU 11 performs a header translation process by referencing the mapping table 61 (FIG. 6A) to convert the source field of the packet to the physical ID (=1) of the transceiver node 220 on a predetermined basis and convert the destination field to the physical ID (=0) of node 241 according to the referenced mapping table 61. Subsequently, the CPU 11 provides a header mapping process by identifying the write transaction with a unique transaction label and mapping the old source and destination IDs to the new source and destination IDs in the RAM 13. CPU 11 formulates a write request packet with a new header containing the translated source and destination IDs and the transaction label and forwards the packet to the link layer processor 32. Link layer processor 32, knowing that the transmission speed is set equal to "0", forwards the packet to the bus B2 at 100 Mbps (step SP4).

On receiving the write request packet from the bus B2, the communication node 241 returns an ack_pending packet to the node 220 (step SP5). Then, the node 241 formulates a write response packet with a header containing the transaction label and the source and destination fields set to the physical ID (=0) of its own node 241 and the physical ID (=1) of the transceiver node 220, respectively, and forwards the packet onto the bus B2 at 100 Mbps (step SP6). The write response packet is received by the transceiver node 220, which returns an ack_complete packet to the node 241 (step SP7).

The write response packet from node 241 received by the node 220 is stored in the RAM 13. CPU 11 examines the RAM 13 by comparing the transaction label and the source and destination IDs contained in the write response packet with those stored in the RAM 13, and knows that node 200 has received a corresponding write response packet from node 241 in response to the write request packet which the node 210 had previously received from node 231.

A header translation process proceeds in the CPU 11 by replacing the contents of the source and destination fields of the packet header with the physical ID (=3) of node 210 and the physical ID (=2) of node 231, respectively. The header-translated write response packet is read out of the RAM 13 and passed to the link layer processor 31 of node 210 (step SP8). Since the transmission speed is set equal to "3", the link layer processor 31 forwards the header-translated write response packet to the bus B1 at 400 Mbps (step SP9). Node 231 receives this packet and returns an ack_complete packet to the node 210 (step SP10).

If the communication node 241 initiates a transaction, the speed converter 101 proceeds in the same manner as that described above with the exception that the mapping table 62 (FIG. 6B) is used instead of the mapping table 61.

Since most of low speed nodes currently available in the market issue transaction requests only to an isochronous resource manager that is attached to the same bus as the requesting node, the provision of only one mapping table may be sufficient for such nodes. In the above example, the communication node 241 is the low speed node. If the node 241 is of the type of node that issues transaction requests only to the isochronous resource manager connected to the bus B2, the mapping table 62 is not required.

Figure 8A:
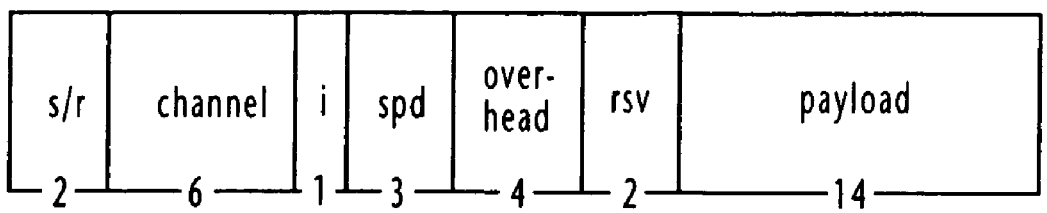
FIG. 8A shows a data format of the stream control register provided in each link layer processor.

For stream packet transfers, each of the link layer processors 31 and 32 has a 32-bit stream control register (SCR) whose format is shown in FIG. 8A. The stream control register is divided into seven fields. The first 2-bit field is a "send/receive" field which is used to indicate whether a stream packet is to be transmitted to a bus or received from the bus. Specifically, decimal "1" and "2" in the send/receive field indicates reception and transmission, respectively. The second 6-bit "channel" field is used to specify the channel number allocated by the isochronous resource manager to the stream packet. A "1" or a "0" in the one-bit "i" field respectively indicate that the stream packet is an isochronous stream packet or an asynchronous stream packet. The 3-bit "speed" field indicates the transmission speed of the stream packet, with decimal "0", "1" and "2" respectively indicating the speeds of 100, 200 and 400 Mbps. The 4-bit "overhead" field and the 14-bit "payload" field are used to specify the bandwidth necessary for the transmission of the stream packet. The 2-bit "reserved" field is a field that is reserved for future use.

Figure 8B:
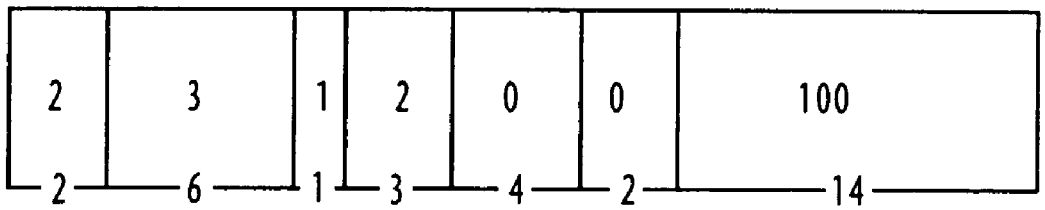
FIGS. 8B and 8C show example data formats of the stream control registers provided respectively in link layer processors.
Figure 8C:
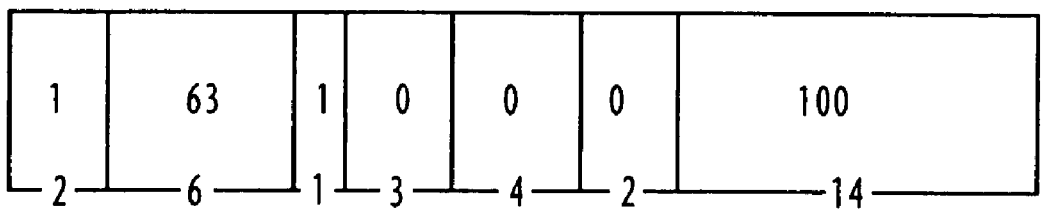

If the transceiver node 210 transmits a 400-Mbps isochronous stream packet to the bus B1 and the transceiver node 220 receives a 100-Mbps isochronous stream packet from the bus B2, and channel numbers "3" and "63" are assigned to the nodes 210 and 220, respectively, the stream control register of link layer processors 31 and 32 will be set as shown in FIGS. 8B and 8C. Specifically, in decimal notation, "2" and "1" are set in the send/receive field of link layer processors 31 and 32, and "3" and "63" are set in the respective channel fields, "2" and "0" are set in the respective speed fields, and a "1" is set in the "i" fields. Arbitrary values are shown set in the overhead and payload fields.

In the illustrated example, the channel number "63" of an inbound isochronous stream packet from bus B2 is translated to the channel number "3" for an outbound isochronous stream packet for transmission to the bus B1. The process of setting different channel numbers into the channel field of the SCR of each link layer processor will be discussed later.

In a practical aspect of the present invention, the transceiver node 210 is provided with plug registers which are defined according to the IEC-61883 Standard. Based on the parameters set in the plug control registers, the settings of stream control register of the link layer processor 31 are determined.

Specifically, as shown in FIGS. 9A to 9D, four types of 32-bit registers are provided: an output master plug register (oMPR), an output plug control register (oPCR), an input master plug register (iMPR), and an input plug control register (iPCR). The oMPR and oPCR are used for setting the SCR of the link layer processor 31 for transmission of isochronous packets and the iMPR and iPCR are used for setting the SCR for reception of isochronous packets. Each MPR and the iPCR are divided into six fields and the oPCR is divided into eight fields. The initial values of these MPR and PCR registers in the transceiver node are set equal to parameters set in the corresponding registers of the communication node 231, for example, with the exception that the data rate capability fields of both MPRs and the data rate field of the oPCR are set equal to the speed setting value of switch 41. In the illustrated examples of FIGS. 8B and 8C, these data rate capability and data rate fields of node 210 are set equal to the speed value of 400 Mbps.

In operation, the transceiver node 211 translates a first channel number contained in an isochronous packet from the bus B2 to a second channel number set in the channel number field of the oPCR when a value indicating transmission of an isochronous packet is set in the oMPR. The transceiver node 211 translates the second channel number contained in an isochronous packet from the bus B1 to the first channel number contained in the isochronous packet received from the bus B2 when a value indicating reception of an isochronous packet is set in the iPCR.

According to the IEEE-1394 Standard, each node of the network has a configuration ROM in which the capability and functions of the node are stored. Assume that the communication node 231 initiates an isochronous transaction by transmitting a read request packet to the node 210 in the same manner as described above in connection with asynchronous transfers in order to know what functions the node 210 are capable of. In response to the read request packet from node 231, the transceiver node 210 accesses its own configuration ROM to read the functions of node 210. After header translation, the data read from the configuration ROM are set into the payload field of the read request packet and this header-translated packet is forwarded from node 220 to node 241. In response, the node 241 accesses its own configuration ROM to read its contents and returns a read response packet containing the contents of the configuration ROM of node 241. After header translation, the node 210 transmits the read response packet back to the requesting node 231. Node 231 examines the contents of the read response packet and determines the target node that can provide the capability which is desired by the requesting node. Note that the configuration ROM just described above is preferably in an address space from "FFFF F000 0400" to "FFFF F000 O07FC" defined on the address space of each of the buses B1 and B2.

Figure 10:
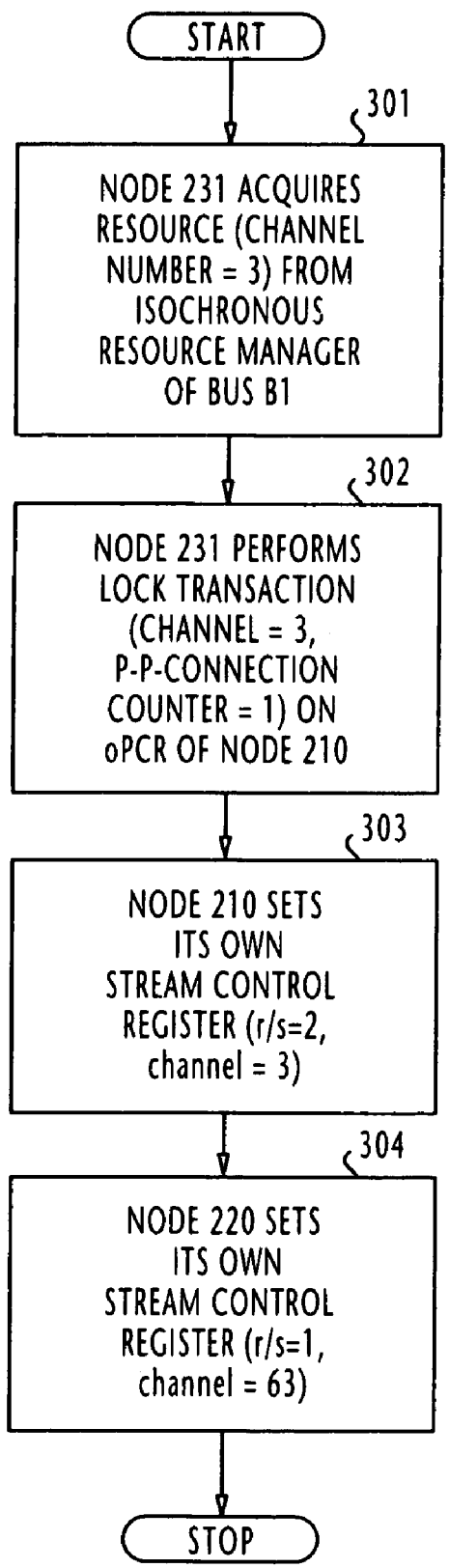
FIG. 10 is a flowchart illustrating a process for setting speed values into the stream control registers of both link layer processors.

After determining the target node, different channel numbers are set in the stream control registers of link layer processors 31 and 32 according to a flowchart shown in FIG. 10.

At step 301, the node 231 acquires a channel number (i.e., "3") from the isochronous resource manager that is attached to the bus B1. Node 231 initiates a lock transaction to the node 210 by setting the acquired channel number into the channel number field of the oPCR with and a "1" into the point-to-point connection counter field of the oPCR (step 302). At step 303, the node 210 sets the send/receive field and channel field of its own stream control register with values "2" and "3", respectively. Thus, the node 210 is set in a transmit mode for transmitting a stream packet of channel number "3" to the node 231. At step 304, the node 220 sets a value of "1" in the send/receive field of its own stream control register and a default value of "63" in its channel field.

With the stream control registers of nodes 210 and 220 being set, an isochronous transfer from node 241 to node 231 begins. In this isochronous transfer, stream packets from node 241 are received by the transceiver node 220 at 100 Mbps and forwarded through the isochronous data path S1 to the node 210 where the channel number of the packet is translated from the value "63" to the value "3" set in the stream control register of node 210 and transmitted at 400 Mbps according to the speed value set in the speed field of the SCR.

For isochronous transfer, the frequency difference which would otherwise arise between the buses B1 and B2 is minimized by synchronizing the clock timing of bus B2 to the clock timing of bus B1. This synchronization is achieved by making the node 220 to perform the role of a cycle master.

Figure 11:
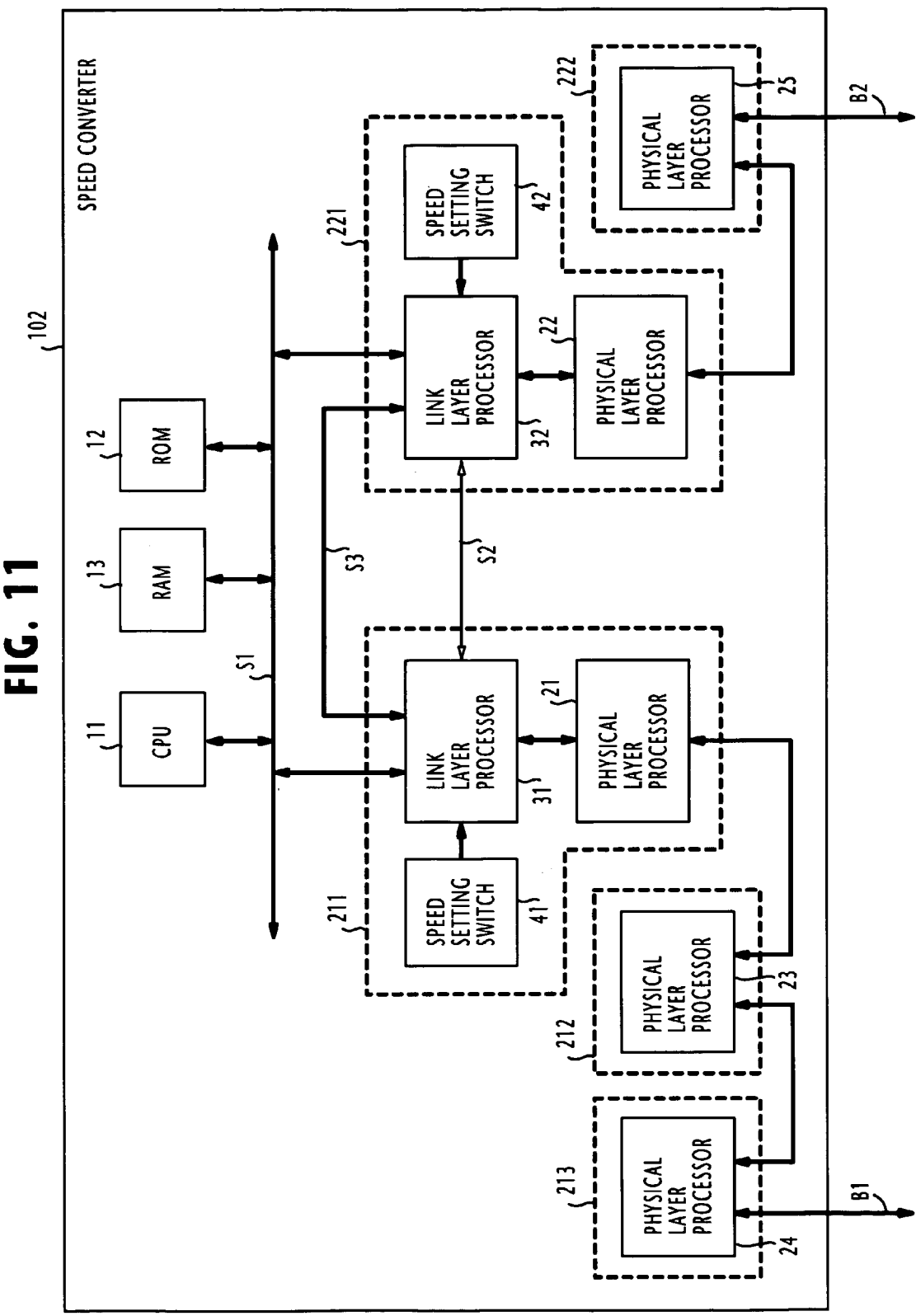
FIG. 11 is a block diagram of a speed converter according to a second embodiment of the present invention.

FIG. 11 illustrates a second embodiment of the present invention. Speed converter 102 of this embodiment additionally includes physical layer processors 23 and 24 connected in series (daisy-chained) between the physical layer processor 21 and the bus B1, and a physical layer processor 25 connected in series between the physical layer processor 22 and the bus B2.

Since the physical layer processors 23, 24 and 25 all function as repeaters, they are designated as repeater nodes 212, 213 and 222, respectively. Similar to the previous embodiment, the link layer processor 31 and physical layer processor 21 function as a transceiver node 211 and the link layer processor 32 and physical layer processor 22 function as a transceiver node 221. Each of the transceiver nodes 211 and 221 further consists of a software-implemented transaction layer. All nodes of the network are identified by a physical ID.

Figure 12:
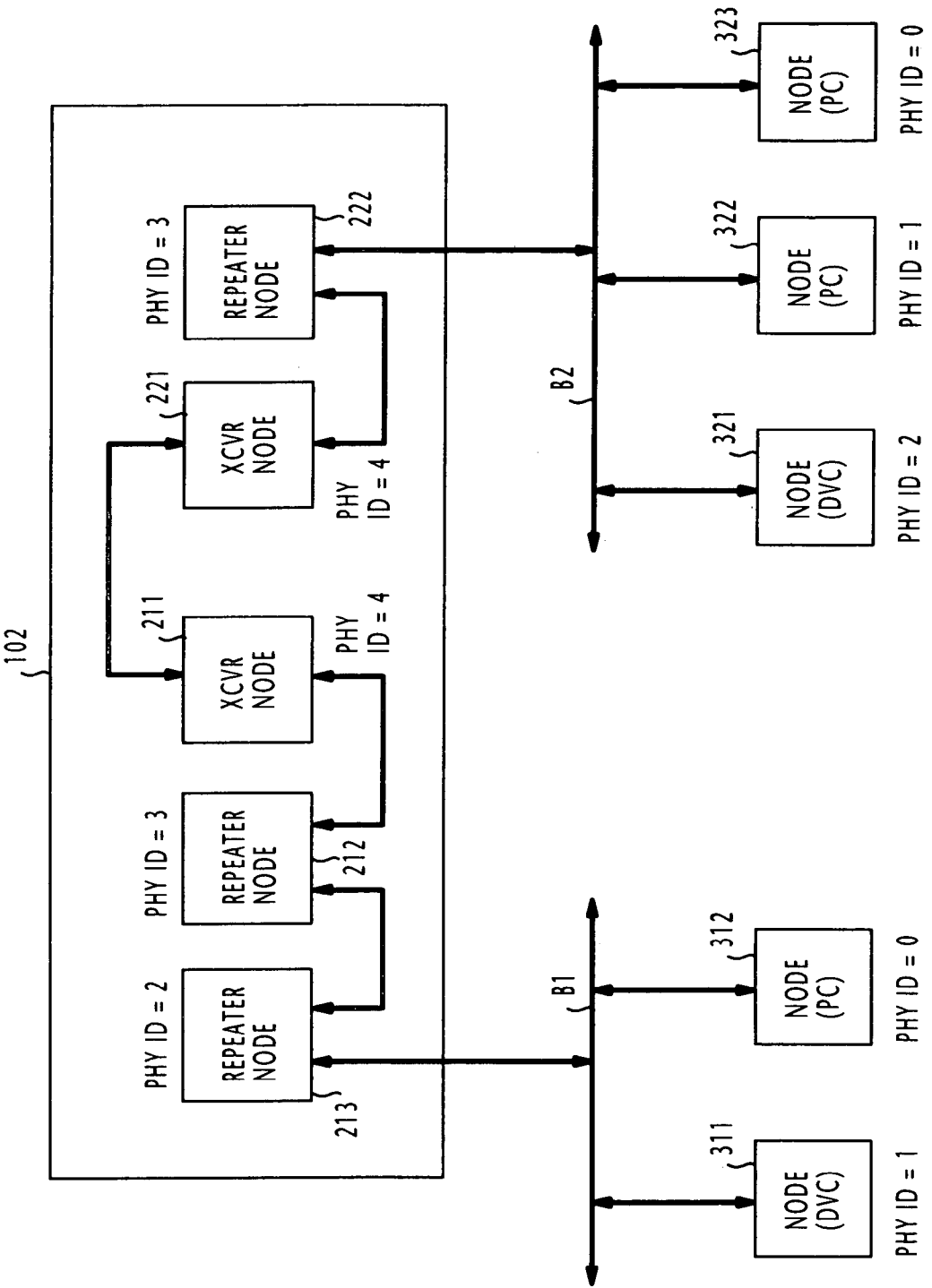
FIG. 12 is a block diagram of a simplified IEEE-1394 serial bus network associated with FIG. 11.

As shown in FIG. 12, communication nodes 311 and 312 are attached to the bus B1 of FIG. 11 and communication nodes 321, 322 and 323 are attached to the bus B2. For illustration, the nodes 311 and 321 are assumed to be a digital video camera with a transmission speed of 200 Mbps, while the other nodes are personal computers capable of operating at 400 Mbps.

Note that the link layer processor 31 of transceiver node 211 is capable of receiving asynchronous packets from bus B1, containing not only its own physical ID but also the physical IDs of the repeater nodes 212 and 213. Likewise, the link layer processor 32 of transceiver node 221 is capable of receiving asynchronous packets from bus B2, containing the physical ID of the repeater node 222 as well as its own physical ID. The speed of transmission of asynchronous packets from each of the transceiver nodes 211 and 221 is set to the maximum available value and the speed of transmission of stream packets is set to 400 Mbps.

FIGS. 13A and 13B show two mapping tables and 72 defined in the RAM 13. In the mapping table 71, the transceiver node 211 and repeater nodes 212, 213 are mapped to the communication nodes 321, 322 and 323 on the bus B2, respectively. In the mapping table 72, the transceiver node 221 and repeater node 222 are mapped to the communication nodes 311 and 312 on the bus B1, respectively.

Assume that the transceiver node 211, for example, receives a configuration-ROM read request packet from communication node 312 on bus B1 and the configuration ROM data of all communication nodes are stored in the RAM 13. In response to the read request from node 312, the transceiver node 211 reads from the RAM 13 the configuration ROM data of communication node 321 on bus B2 that is defined in the mapping table 71 as a node corresponding to the transceiver node 211 and returns a read response packet containing the read configuration ROM data. Therefore, the communication nodes 321, 322, 323 on bus B2 are "visible" from all communication nodes on bus B1, instead of the nodes 211, 212 and 213. Likewise, the communication nodes 311 and 312 on bus B1 are "visible" from all communication nodes on bus B2, instead of the nodes 221 and 222.

If the computer node 312 on bus B1 performs a configuration-ROM read request transaction on the other nodes of bus B1, it will recognize nodes 311 and 211 as a digital video camera. Likewise, if the computer nodes 322 and 323 on bus B2 perform a configuration-ROM read request transaction on the other nodes of bus B2, they will recognize nodes 321 and 221 as a digital video camera.

Following the configuration-ROM read request transaction, the computer node 312 on bus B1 sends an asynchronous request packet to the transceiver node 211. Specifically, the computer node 312 specifies the allocated channel number and the set speed by performing a write transaction on a register whose location is offset by "$60C_h$" from the reference address value and starts a data transfer by performing a write transaction on a register whose offset value is "$614_h$". Note that the reference address value is written on the Unit Dependent Directory of the configuration ROM of node 312.

Transceiver node 211, on receiving the write request packet, stores the packet in the RAM 13. CPU 11 performs a header translation by rewriting the destination field of the request packet (which contains the physical ID of node 211) with the physical ID of node 321 according to physical ID of node 312) with the physical ID of node 222 according to the mapping table 72.

The header-translated write request packet is then forwarded from the RAM 13 to the transceiver node 221 and then transmitted at the maximum speed of 200 Mbps to the digital video camera 321 via the repeater node 222.

Digital video camera 321 responds to the write request packet with a write response packet, which is received by the transceiver node 221 via the repeater node 222 and stored in the RAM 13 for header translation. CPU 11 performs this header translation by rewriting the destination field of the response packet (which contains the physical ID of node 222) with the physical ID of node 312 according to the mapping node 321) with the physical ID of node 211 according to the mapping table 71. The header-translated write response packet is forwarded from the RAM 13 to the transceiver node 211 and then transmitted to the computer node 312 at 400 Mbps which is the maximum transfer speed between the nodes 211 and 312.

When the write transaction is successful, the speed converter 102 proceeds to set the stream control registers of the respective link layer processors 31, 32 so that isochronous packets from the digital video camera 321 can be forwarded through the transceiver node 211 onto the bus B1 at 400 Mbps.

In the IEEE-1394 serial bus network, bus reset is initiated under various circumstances, which forces all nodes into their initialization state, thereby initiating the configuration process. Preferably, the transceiver node 221 is provided with a bus reset recovery feature to minimize the interruption of data transfer caused by a bus reset. If bus reset occurs on the bus B2 during the data transfer from the digital video camera 321 to the transceiver node 221, the latter senses this condition and performs a write transaction on the register of offset address value "$614_h$" to enable the video camera 321 to reinitiate the isochronous transfer by resetting the transmit/receive state of its stream control register.

Prior to storage of the configuration ROM data of all communication nodes of the network into the random access memory 13, the lower 64 bits of Bus_Info_Block of the configuration data and the lower 64 bits of Node_Unique_Id leaf are preferably rewritten with the module_vendor_id field of the Module_Vendor_Id entry is rewritten with the company ID indicating the manufacturer of the speed converter 102. The EUI-64, consisting of a 24-bit manufacturer's identifier and a 40-bit chip identifier, is an identifier which is assigned uniquely to all nodes of the network which are provided with the general format configuration ROM.

When a configuration ROM read request packet is asserted on a given transceiver node of speed converter 102, the rewritten configuration data is read from the RAM 13 and only the device function is enabled to appear as if it were the same entity as the node that corresponds in the mapping table to the given transceiver node. In addition, the rewriting of the configuration ROM data eliminates the need to alter the specifications of digital video controllers.

More specifically, if the transceiver node 211 receives a configuration ROM read request packet from the bus B1, it reads configuration ROM data from the memory 13 corresponding to the destination identifier contained in the received read request packet and transmits a read response packet to the bus B1 containing the read configuration ROM data. If the transceiver node 221 receives a configuration ROM read request packet from the bus B2, it reads configuration ROM data from the memory 13 corresponding to the destination identifier contained in the received read request packet and transmits a read response packet to the second bus containing the read configuration ROM data.

Figure 14:
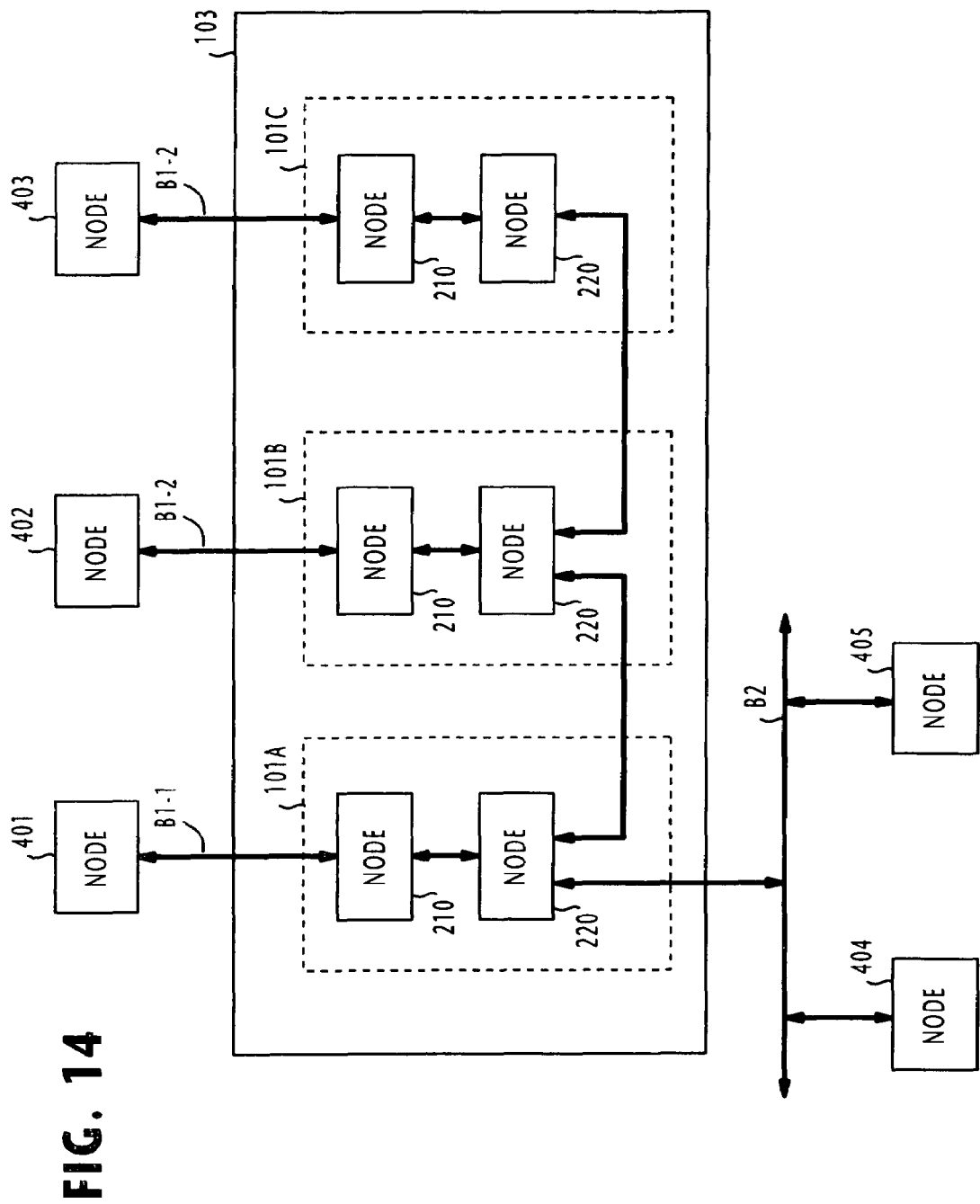
FIG. 14 is a block diagram of a third embodiment of the present invention.

A third embodiment of the present invention is shown in FIG. 14 in which speed converters 101A, 101B and 101C of the same configuration as that of FIG. 1 are incorporated in a single speed converter 103. These speed converters are set at different speed values. The transceiver nodes 210 of the speed converters 101A, 101B, 101C are connected to buses B1-1, B1-2 and B1-3, respectively, and the transceiver nodes 220 of these speed converters are connected in series to the bus B2; High speed communication nodes 401, 402 and 403 are attached to the buses B1-1, B1-2 and B1-3, respectively, and low speed communication nodes 404 and 405 are attached to the bus B2. Similar to the first embodiment, all the transceiver nodes 220 are recognized by the communication nodes 404 and 405 as if they were the high speed communication nodes 401, 402 and 403. In this way, data transfer can be provided at a number of different speeds.

As described above, in the speed converter for an IEEE-1394 serial bus network, a first transceiver node represents a low speed communication node on one bus and performs data transfer with a high speed communication node on the other bus and a second transceiver represents the high speed communication node and performs data transfer with the low speed communication node. A high speed device can maintain its transmission speed when communicating with a low speed device through the speed converter of the present invention, and a substantial resource saving is achieved for the IEEE-1394 serial bus. Experiments showed that more than three digital video channels were successfully transmitted on the same IEEE-1394 serial bus.

What is claimed is:

1. A speed converter for converting the speed of packets transmitted between first and second communication nodes respectively attached to first and second IEEE-1394 serial buses, comprising:
a first transceiver node for receiving an inbound first packet at a first speed from the first bus and transmitting an inbound second packet as an outbound second packet at the first speed to the first bus;
a second transceiver node for transmitting said inbound first packet as an outbound first packet at a second speed to the second bus and receiving said inbound second packet at the second speed from the second bus; and
header translation circuitry for translating destination identifier of said inbound first packet to destination identifier of said outbound first packet according to a mapped relationship between the first transceiver node and the second communication node, and translating destination identifier of said inbound second packet to destination identifier of said outbound second packet,
wherein the first transceiver node comprises:
a first physical layer processor connected to said first bus;
a first link layer processor connected to the first physical layer processor; and
first speed setting means for setting a value representative of said first speed into said first link layer processor,
wherein said second transceiver node comprises:
a second physical layer processor connected to said second bus;
a second link layer processor connected to the second physical layer processor; and
second speed setting means for setting a value representative of said second speed into said second link layer processor,
wherein said header translation circuitry comprises:
a memory for storing identifiers for mapping said first transceiver node to said second communication node; and
control circuitry connected to said first and second link layer processors for receiving a packet therefrom and rewriting destination identifier of the packet according to the identifiers stored in said memory when a transaction is initiated from said first bus.

2. A speed converter for converting the speed of packets transmitted between a plurality of first communication nodes attached to a first IEEE-1394 serial bus and a plurality of second communication nodes attached to a second IEEE-1394 serial bus, comprising:
at least one first repeater node connected to the first bus;
a first transceiver node for receiving an inbound first asynchronous packet from the first bus at a first speed via said at least one first repeater node and transmitting an inbound second asynchronous packet as an outbound second asynchronous packet at the first speed to the first bus via said at least one first repeater node, the first transceiver node having identifiers identifying the first transceiver node itself and said at least one first repeater node;
at least one second repeater node connected to the second bus;
a second transceiver node for transmitting said inbound first asynchronous packet as an outbound first asynchronous packet to the second bus at a second speed via at least one second repeater node and receiving the inbound second asynchronous packet from the second bus at the second speed via said at least one second repeater node and receiving said inbound second asynchronous packet at the second speed from the second bus via said at least one second repeater node, the second transceiver node having identifiers identifying the second transceiver node itself and said at least one second repeater node; and
header translation circuitry for translating destination identifier of said inbound first asynchronous packet received by the first transceiver node to destination identifier of said outbound first asynchronous packet according to mapped relationships between said second communication nodes and said first transceiver node and said at least one first repeater node, and translating destination identifier of said inbound second asynchronous packet received by the second transceiver node to destination identifier of said outbound second asynchronous packet according to mapped relationships between said first communication nodes and said second transceiver node and said at least one second repeater node, wherein said second transceiver node receives, from the second bus, an isochronous packet containing a first channel number at said second speed, and wherein said first transceiver node receives the isochronous packet from the second transceiver node and translates the first channel number of the received packet to a second channel number and transmits the isochronous packet containing the second channel number at said first speed to the first bus.

3. A speed converter for converting the speed of packets transmitted between first and second communication nodes respectively attached to first and second IEEE-1394 serial buses, comprising:

a first transceiver node for receiving an inbound first packet at a first speed from the first bus and transmitting an inbound second packet as an outbound second packet at the first speed to the first bus;

a second transceiver node for transmitting said inbound first packet as an outbound first packet at a second speed to the second bus and receiving said inbound second packet at the second speed from the second bus; and header translation circuitry for translating destination identifier of said inbound first packet to destination identifier of said outbound first packet according to a mapped relationship between the first transceiver node and the second communication node, and translating destination identifier of said inbound second packet to destination identifier of said outbound second packet, wherein said second transceiver node receives, from the second bus, an isochronous packet containing a first channel number at said second speed, and wherein said first transceiver node receives the isochronous packet from the second transceiver node and translates the first channel number of the received packet to a second channel number and transmits the isochronous packet containing the second channel number at said first speed to the first bus.

4. A speed converter for converting the speed of packets transmitted between first and second communication nodes respectively attached to first and second IEEE-1394 serial buses, comprising:

a first transceiver node for receiving an inbound first packet at a first speed from the first bus and transmitting an inbound second packet as an outbound second packet at the first speed to the first bus;

a second transceiver node for transmitting said inbound first packet as an outbound first packet at a second speed to the second bus and receiving said inbound second packet at the second speed from the second bus;

header translation circuitry for translating destination identifier of said inbound first packet to destination identifier of said outbound first packet according to a mapped relationship between the first transceiver node and the second communication node, and translating destination identifier of said inbound second packet to destination identifier of said outbound second packet; and means for synchronizing clock timing of said first transceiver node to clock timing of said second transceiver node.

5. A speed converter for converting the speed of packets transmitted between a plurality of first communication nodes attached to a first IEEE-1394 serial bus and a plurality of second communication nodes attached to a second IEEE-1394 serial bus, comprising:

at least one first repeater node connected to the first bus;

a first transceiver node for receiving an inbound first asynchronous packet from the first bus at a first speed via said at least one first repeater node and transmitting an inbound second asynchronous packet as an outbound second asynchronous packet at the first speed to the first bus via said at least one first repeater node, the first transceiver node having identifiers identifying the first transceiver node itself and said at least one first repeater node;

at least one second repeater node connected to the second bus;

a second transceiver node for transmitting said inbound first asynchronous packet as an outbound first asynchronous packet to the second bus at a second speed via at least one second repeater node and receiving the inbound second asynchronous packet from the second bus at the second speed via said at least one second repeater node and receiving said inbound second asynchronous packet at the second speed from the second bus via said at least one second repeater node, the second transceiver node having identifiers identifying the second transceiver node itself and said at least one second repeater node; and header translation circuitry for translating destination identifier of said inbound first asynchronous packet received by the first transceiver node to destination identifier of said outbound first asynchronous packet according to mapped relationships between said second communication nodes and said first transceiver node and said at least one first repeater node, and translating destination identifier of said inbound second asynchronous packet received by the second transceiver node to destination identifier of said outbound second asynchronous packet according to mapped relationships between said first communication nodes and said second transceiver node and said at least one second repeater node, wherein the first transceiver node comprises:

a first physical layer processor;

a first link layer processor connected to the first physical layer processor; and first speed setting means for setting a value representative of said first speed into said first link layer processor, wherein said at least one first repeater node comprises a second physical layer processor connected in series between said first bus and said first physical processor;

wherein said second transceiver node comprises:

a third physical layer processor;

a second link layer processor connected to the third physical layer processor; and second speed setting means for setting a value representative of said second speed into said second link layer processor, wherein said at least one second repeater node comprises a fourth physical layer processor connected in series between said second bus and said fourth physical processor;

wherein said header translation circuitry comprises:

a memory for storing identifiers for mapping said second communication nodes to said first transceiver node and said at least one first repeater node and storing identifiers for mapping said first communication nodes to the second transceiver node and said at least one second repeater node; and control circuitry connected to said first and second link layer processors for receiving an asynchronous packet therefrom and rewriting destination identifier of the asynchronous packet according to the identifiers stored in said memory when a transaction is initiated from each of said first and second buses.

6. The speed converter of claim 1 or 5, wherein said first link layer processor includes first register means for setting a first channel number and said second link layer processor includes second register means for setting a second channel number, said second link layer processor receiving an isochronous packet containing said second channel number from said second bus at said second speed and forwarding the received packet to said first link layer processor via a data path, said first link layer processor translating the channel number of said isochronous packet forwarded from said second link layer processor to said first channel number and transmitting the channel number translated isochronous packet toward the first bus at said first speed.

7. A speed converter for converting the speed of packets transmitted between a plurality of first communication nodes attached to a first IEEE-1394 serial bus and a plurality of second communication nodes attached to a second IEEE-1394 serial bus, comprising:

at least one first repeater node connected to the first bus;

a first transceiver node for receiving an inbound first asynchronous packet from the first bus at a first speed via said at least one first repeater node and transmitting an inbound second asynchronous packet as an outbound second asynchronous packet at the first speed to the first bus via said at least one first repeater node, the first transceiver node having identifiers identifying the first transceiver node itself and said at least one first repeater node;

at least one second repeater node connected to the second bus;

a second transceiver node for transmitting said inbound first asynchronous packet as an outbound first asynchronous packet to the second bus at a second speed via at least one second repeater node and receiving the inbound second asynchronous packet from the second bus at the second speed via said at least one second repeater node and receiving said inbound second asynchronous packet at the second speed from the second bus via said at least one second repeater node, the second transceiver node having identifiers identifying the second transceiver node itself and said at least one second repeater node; and header translation circuitry for translating destination identifier of said inbound first asynchronous packet received by the first transceiver node to destination identifier of said outbound first asynchronous packet according to mapped relationships between said second communication nodes and said first transceiver node and said at least one first repeater node, and translating destination identifier of said inbound second asynchronous packet received by the second transceiver node to destination identifier of said outbound second asynchronous packet according to mapped relationships between said first communication nodes and said second transceiver node and said at least one second repeater node, wherein the first transceiver node is responsive to receipt of a first asynchronous request packet requesting start or end of transmission of isochronous packets from said first bus for forwarding the received first asynchronous request packet to said second transceiver node, wherein the second transceiver node is responsive to the first asynchronous request packet from the first transceiver node for setting the second transceiver node in a state for preparing start or end of transmission of isochronous packets to said second bus, wherein the first transceiver node is responsive to receipt of a second asynchronous request packet requesting start or end of reception of isochronous packets from said first bus for setting the first transceiver node in a state for preparing start or end of transmission of isochronous packets to the first bus.

8. The speed converter of claim 7, wherein the second transceiver node transmits an asynchronous request packet to the second bus requesting one of the communication nodes on the second bus for starting or ending transmission of isochronous packets when the first transceiver node receives said first asynchronous request packet from the first bus, wherein the second transceiver node transmits an asynchronous request packet to the second bus requesting said one communication node to set in a state preparing for start or end of reception of isochronous packets when the first transceiver node receives said second asynchronous request packet from the first bus.

9. The speed converter of claim 8, wherein one of said first and second transceiver nodes includes bus reset recovery means responsive to an occurrence of a bus reset for resetting said one of the communication nodes in the state which was attained when said bus reset occurred.

10. The speed converter of claim 8, wherein said first transceiver node includes an output master plug register (oMPR), an input master plug register (iMPR), an output plug control register (oPCR) and an input plug control register (iPCR), all of said plug and control registers being specified according to IEC-61883 standard, wherein said first transceiver node (211) is arranged to initialize said plug and control registers according to values set in said one communication node on said second bus, and modify values set in data rate capability field of said oMPR and iMPR and a value set in data rate field of said oPCR to said first speed.

11. The speed converter of claim 10, wherein said first transceiver node translates a first channel number contained in a first isochronous packet from said second bus to a second channel number set in channel number field of said oPCR when a value indicating transmission of an isochronous packet is set in said oMPR, wherein said first transceiver node translates the second channel number contained in a second isochronous packet from said first bus to said first channel number contained in said first isochronous packet when a value indicating reception of an isochronous packet is set in said iPCR.

12. The speed converter of claim 11, wherein said first channel number is a default number of decimal 63.

13. A speed converter for converting the speed of packets transmitted between first and second communication nodes respectively attached to first and second IEEE-1394 serial buses, comprising:

a first transceiver node for receiving an inbound first packet at a first speed from the first bus and transmitting an inbound second packet as an outbound second packet at the first speed to the first bus;

a second transceiver node for transmitting said inbound first packet as an outbound first packet at a second speed to the second bus and receiving said inbound second packet at the second speed from the second bus; and header translation circuitry for translating destination identifier of said inbound first packet to destination identifier of said outbound first packet according to a mapped relationship between the first transceiver node and the second communication node, and translating destination identifier of said inbound second packet to destination identifier of said outbound second packet, wherein the asynchronous packet received from one of said first and second buses is a configuration ROM read request packet for accessing a configuration ROM having a bus address in the range between a hexadecimal value of FFFF F000 0400 and a hexadecimal value of FFFF F000 07FC.

14. A speed converter for converting the speed of packets transmitted between first and second communication nodes respectively attached to first and second IEEE-1394 serial buses, comprising:

a first transceiver node for receiving an inbound first packet at a first speed from the first bus and transmitting an inbound second packet as an outbound second packet at the first speed to the first bus;

a second transceiver node for transmitting said inbound first packet as an outbound first packet at a second speed to the second bus and receiving said inbound second packet at the second speed from the second bus; and header translation circuitry for translating destination identifier of said inbound first packet to destination identifier of said outbound first packet according to a mapped relationship between the first transceiver node and the second communication node, and translating destination identifier of said inbound second packet to destination identifier of said outbound second packet, wherein said memory stores configuration ROM data of the communication nodes of said first and second buses, wherein said first transceiver node is responsive to receipt of a configuration ROM read request packet from said first bus for reading configuration ROM data from said memory corresponding to the destination identifier contained in the received read request packet and transmitting a read response packet to the first bus containing the read configuration ROM data, wherein said second transceiver node is responsive to receipt of a configuration ROM read request packet from said second bus for reading configuration ROM data from said memory corresponding to the destination identifier contained in the received read request packet and transmitting a read response packet to the second bus containing the read configuration ROM data.

15. The speed converter of claim 14, wherein the configuration ROM data stored in said memory by rewriting lower 64 bits of Bus_Info_Block of configuration ROM data of each of said communication nodes and lower 64 bits of Node_Unique_1d leaf with 64-bit Extended Unique Identifier and rewriting module_vendor_id field of Module_Vendor_1d entry with a company ID indicating the manufacturer of the speed converter.

16. A method of converting the transmission speed of packets transmitted between a first communication node and a second communication node respectively attached to first and second IEEE-1394 serial buses, comprising:

receiving, at a first transceiver node, an inbound first packet transmitted at a first speed from said first bus;

translating destination identifier of said inbound first packet to destination identifier of an outbound first packet;

transmitting the outbound first packet from a second transceiver node to the second bus at a second speed;

receiving, at said second transceiver node, an inbound second packet at said second speed from said second bus;

translating destination identifier of said inbound second packet to destination identifier of an outbound second packet;

transmitting the outbound second packet from the first transceiver node to said first bus at said first speed;

setting a first channel number in said first transceiver node and setting a second channel number in said second transceiver node;

receiving, at said second transceiver node, an isochronous packet containing a second channel number from said second bus at said second speed;

translating the channel number of said isochronous packet to said first channel number at said first transceiver node; and transmitting the channel-translated isochronous packet from the first transceiver node to the first bus at said first speed.

17. A method of converting the speed of packets transmitted between a plurality of first communication nodes attached to a first IEEE-1394 serial bus and a plurality of second communication nodes attached to a second IEEE-1394 serial bus, comprising:

receiving, at a first transceiver node, an inbound first packet from the first bus at a first speed via at least one first repeater node;

translating destination identifier of said inbound first packet to destination identifier of an outbound first packet according to relationships between said second communication nodes and said first transceiver node and said at least one first repeater node;

transmitting from a second transceiver node said outbound first packet to the second bus at a second speed via at least one second repeater node;

receiving, at said second transceiver node, an inbound second packet from the second bus at the second speed via said at least one second repeater node;

translating destination identifier of said inbound second packet to destination identifier of an outbound second packet according to relationships between said first communication nodes and said second transceiver node and said at least one second repeater node;

transmitting from the first transceiver node said outbound second packet to the first bus via said at least one first repeater node at said first speed;

setting a first channel number in said at least one first transceiver node and setting a second channel number in said at least one second transceiver node;

receiving, at said at least one second transceiver node, an isochronous packet containing a second channel number from said second bus at said second speed;

translating the channel number of said isochronous packet to said first channel number at said at least one first transceiver node; and transmitting the channel-translated isochronous packet from said at least one first transceiver node to the first bus at said first speed.

18. A speed converter for converting the speed of packets transmitted between a plurality of first communication nodes attached to a first IEEE-1394 serial bus and a plurality of second communication nodes attached to a second IEEE-1394 serial bus, comprising:

at least one first repeater node connected to the first bus;

a first transceiver node for receiving an inbound first asynchronous packet from the first bus at a first speed via said at least one first repeater node and transmitting an inbound second asynchronous packet as an outbound second asynchronous packet at the first speed to the first bus via said at least one first repeater node, the first transceiver node having identifiers identifying the first transceiver node itself and said at least one first repeater node;

at least one second repeater node connected to the second bus;

a second transceiver node for transmitting said inbound first asynchronous packet as an outbound first asynchronous packet to the second bus at a second speed via at least one second repeater node and receiving the inbound second asynchronous packet from the second bus at the second speed via said at least one second repeater node and receiving said inbound second asynchronous packet at the second speed from the second bus via said at least one second repeater node, the second transceiver node having identifiers identifying the second transceiver node itself and said at least one second repeater node; and header translation circuitry for translating destination identifier of said inbound first asynchronous packet received by the first transceiver node to destination identifier of said outbound first asynchronous packet according to mapped relationships between said second communication nodes and said first transceiver node and said at least one first repeater node, and translating destination identifier of said inbound second asynchronous packet received by the second transceiver node to destination identifier of said outbound second asynchronous packet according to mapped relationships between said first communication nodes and said second transceiver node and said at least one second repeater node, wherein the asynchronous packet received from one of said first and second buses is a configuration ROM read request packet for accessing a configuration ROM having a bus address in the range between a hexadecimal value of FFFF F000 0400 and a hexadecimal value of FFFF F000 07FC.

19. A speed converter for converting the speed of packets transmitted between a plurality of first communication nodes attached to a first IEEE-1394 serial bus and a plurality of second communication nodes attached to a second IEEE-1394 serial bus, comprising:

at least one first repeater node connected to the first bus;

a first transceiver node for receiving an inbound first asynchronous packet from the first bus at a first speed via said at least one first repeater node and transmitting an inbound second asynchronous packet as an outbound second asynchronous packet at the first speed to the first bus via said at least one first repeater node, the first transceiver node having identifiers identifying the first transceiver node itself and said at least one first repeater node;

at least one second repeater node connected to the second bus;

a second transceiver node for transmitting said inbound first asynchronous packet as an outbound first asynchronous packet to the second bus at a second speed via at least one second repeater node and receiving the inbound second asynchronous packet from the second bus at the second speed via said at least one second repeater node and receiving said inbound second asynchronous packet at the second speed from the second bus via said at least one second repeater node, the second transceiver node having identifiers identifying the second transceiver node itself and said at least one second repeater node; and header translation circuitry for translating destination identifier of said inbound first asynchronous packet received by the first transceiver node to destination identifier of said outbound first asynchronous packet according to mapped relationships between said second communication nodes and said first transceiver node and said at least one first repeater node, and translating destination identifier of said inbound second asynchronous packet received by the second transceiver node to destination identifier of said outbound second asynchronous packet according to mapped relationships between said first communication nodes and said second transceiver node and said at least one second repeater node, wherein said memory stores configuration ROM data of the communication nodes of said first and second buses, wherein said first transceiver node is responsive to receipt of a configuration ROM read request packet from said first bus for reading configuration ROM data from said memory corresponding to the destination identifier contained in the received read request packet and transmitting a read response packet to the first bus containing the read configuration ROM data, wherein said second transceiver node is responsive to receipt of a configuration ROM read request packet from said second bus for reading configuration ROM data from said memory corresponding to the destination identifier contained in the received read request packet and transmitting a read response packet to the second bus containing the read configuration ROM data.

20. A speed converter for converting the speed of packets transmitted between a plurality of first communication nodes attached to a first IEEE-1394 serial bus and a plurality of second communication nodes attached to a second IEEE-1394 serial bus, comprising:

at least one first repeater node connected to the first bus;

a first transceiver node for receiving an inbound first asynchronous packet from the first bus at a first speed via said at least one first repeater node and transmitting an inbound second asynchronous packet as an outbound second asynchronous packet at the first speed to the first bus via said at least one first repeater node, the first transceiver node having identifiers identifying the first transceiver node itself and said at least one first repeater node;

at least one second repeater node connected to the second bus;

a second transceiver node for transmitting said inbound first asynchronous packet as an outbound first asynchronous packet to the second bus at a second speed via at least one second repeater node and receiving the inbound second asynchronous packet from the second bus at the second speed via said at least one second repeater node and receiving said inbound second asynchronous packet at the second speed from the second bus via said at least one second repeater node, the second transceiver node having identifiers identifying the second transceiver node itself and said at least one second repeater node;

header translation circuitry for translating destination identifier of said inbound first asynchronous packet received by the first transceiver node to destination identifier of said outbound first asynchronous packet according to mapped relationships between said second communication nodes and said first transceiver node and said at least one first repeater node, and translating destination identifier of said inbound second asynchronous packet received by the second transceiver node to destination identifier of said outbound second asynchronous packet according to mapped relationships between said first communication nodes and said second transceiver node and said at least one second repeater node; and means for synchronizing clock timing of said first transceiver node to clock timing of said second transceiver node.

* * * * *